Figure 1:
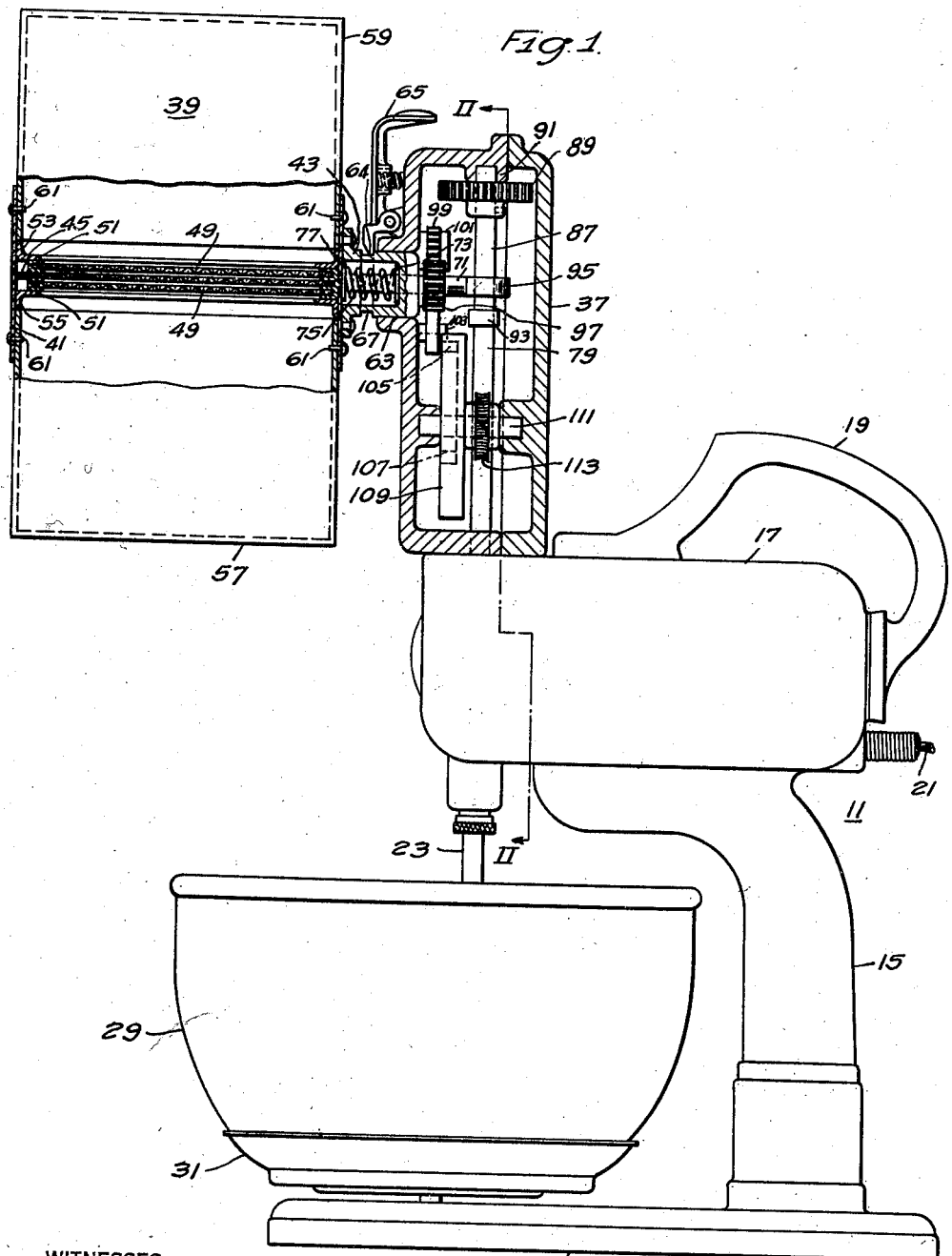

March 16, 1937.  J. S. BOWMAN  2,074,162
FLOUR SIFTER
Filed Oct. 9, 1934  2 Sheets-Sheet 1

WITNESSES:
E. A. McCloskey
Wm. C. Groome

INVENTOR
Joseph S. Bowman.
BY
ATTORNEY

March 16, 1937.   J. S. BOWMAN   2,074,162
FLOUR SIFTER
Filed Oct. 9, 1934   2 Sheets-Sheet 2
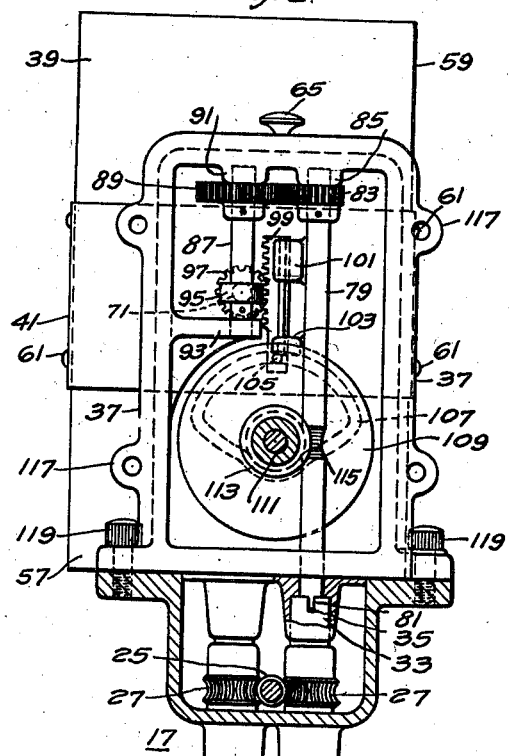
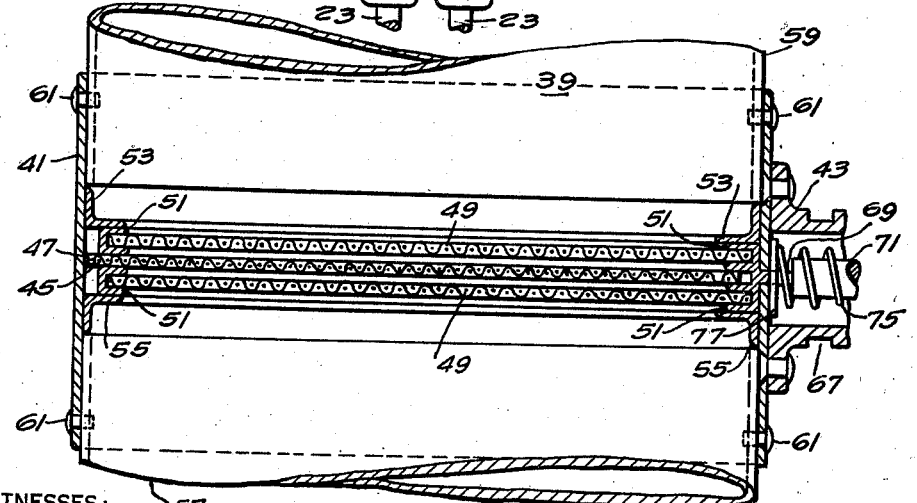
WITNESSES:
E. A. McCloskey
Wm. C. Groome
INVENTOR
Joseph S. Bowman.
BY
ATTORNEY Patented Mar. 16, 1937

2,074,162

UNITED STATES PATENT OFFICE 2,074,162

FLOUR SIFTER

Joseph S. Bowman, El Paso, Tex., assignor to Westinghouse Electric & Manufacturing Company, East Pittsburgh, Pa., a corporation of Pennsylvania Application October 9, 1934, Serial No. 747,507

8 Claims. (Cl. 209—251)

My invention relates to kitchen appliances and particularly to motor-driven flour sifters.

An object of my invention is to provide a simple and efficient flour sifter assembly to be associated with a motor-driven kitchen mixer or beater.

It is well known that better food products, particularly cakes, can be obtained if the flour and other dry ingredients mixed therewith have been sifted a plurality of times, and it is an object of my invention to provide a device which will sift flour or other dry ingredients a plurality of times.

Another object of my invention is to provide a flour sifter in which the position of the material container is reversed repeatedly and in which the sifting element is reciprocated or actuated in a continuous manner.

Other objects of my invention will either be pointed out specifically hereinafter, or will be apparent from the description of one form of the device embodying my invention.

In practicing my invention I provide a casing containing a speed-reducing and driving mechanism readily mountable on a motor assembly constituting part of a kitchen food mixer and a material container removably and rotatably mounted on the casing. The driving mechanism causes continuous reciprocal movement of the sifter element in the material container and intermittent sequential turning movement of the material container.

In the drawings:

Figure 1 is a view, mainly in side elevation, of a motor driven kitchen food mixer having the device embodying my invention mounted thereon, said device being shown partly in section and partly in side elevation, Fig. 2 is a view taken on the line II—II of Fig. 1 showing another view of the speed reducing and driving mechanism, and, Fig. 3 is an enlarged view showing the sifting element in the material container.

Referring to Figs. 1 and 2 of the drawings, I have there illustrated generally only a motor driven kitchen mixer or beater 11 comprising a base 13, a standard 15 thereon, upon which standard there is mounted a motor assembly 17 having a handle 19 thereon so that if desired the motor assembly may be removed from the standard and used independently thereof. Means for energizing the motor in the assembly 17 is shown in the form of short leads 21, it being understood, of course, that these indicate a twin conductor supply circuit energizable in the usual manner.

The motor assembly 17 has depending therefrom a pair of beater rods or shafts 23 spaced apart a short distance and having beater elements (not shown) secured to the lower ends of the shafts 23. The shafts are driven by means of a motor shaft 25 having worm threads on a part thereof, which threads mesh with two worm gears 27 on the upper ends of the shafts 23 or upon suitable tubular driving shafts into which extend the upper ends of shafts 23 in a manner well known in the art. I have illustrated a removable bowl 29 mounted upon a rotatable base 31 which is supported from the fixed base 13 of the kitchen mixer. The details thus far described constitute no part of my invention but have been shown in order to illustrate the cooperation between the device particularly embodying my invention and a motor driven food mixer for operating the same.

One of the shafts 23 has associated therewith an upwardly extending stub shaft 33 having a laterally extending slot 35 in its upper end adapted to be engaged by a tongue member in a manner and for a purpose to be hereinafter set forth in detail.

The device embodying my invention includes a mechanism-containing casing 37 having removably and rotatively associated therewith a sifter assembly 39. The latter includes a central casing portion 41 (see particularly Fig. 3) which may be of substantially circular contour laterally thereof and which may be made of sheet metal having a tubular extension 43 secured thereto, at one side thereof. A substantially fixed sieve 45 is located within the casing portion 41 in fixed position relatively thereto as by being soldered or welded to the inner wall of casing 41, as is shown at 47.

A reciprocally movable sifter element 49 includes an upper and a lower screen of wire mesh, each being held in a substantially annular frame 51, which frame may be of substantially flat channel shape in radial section. An upper guide 53 and a lower guide 55, each of annular shape and made of an angle bar member, are operatively associated with the sifter element 49 to hold the same in proper operative position within the casing portion 41 and to permit substantially continuous reciprocal movements thereof. The material container includes also a pair of closure or end members 57 and 59 which may be of substantially the same size and shape and which are removably associated with the casing portion 41, being secured thereto as by means of pins 61 entering a bayonet type slot in the respective closures 57 and 59, to cooperate with the portion 41 to provide a double chamber or double-ended material container.

The complete material container assembly is rotatably mounted in an opening 63 in the front wall of casing 37 substantially as shown in Fig. 1 of the drawings, and is held in such position by a lug 64 on a manually actuable latch 65, which lug enters a peripheral recess 67 in member 43. The annular members 51 have secured thereto, as by welding or in any other approved manner, a shaft lug 69, the outer end of which is in turn secured to a short shaft 71 which extends outwardly through the closed outer end of member 43. Shaft 71 is provided with an annular recess at that portion thereof located within the hollow tubular member 43 and a stop plate 73, which may be of substantially U-shape fits into the recess to limit the movement of shaft 71 and of the screens 49 in one direction. These parts are yieldingly urged in one direction by a helical spring 75 surrounding the shaft 71 and located within the tubular member 43, one end of which engages plate 73 and the other end of which engages a plate 77 (see Fig. 3) which abuts against one part of casing portion 41. The two screens 49 are therefore yieldingly urged in one direction, to the right as seen in Figs. 1 and 3 of the drawings, from which the sifter element may be moved in the other direction by means now to be described.

Casing 37 has located therein a shaft 79 which has at its lower end a tongue 81 to interfit with the slot 35 hereinbefore described in shaft 33. The upper end of shaft 79 is provided with a pinion 83 and fits into the bearing lug 85 which may be integral with a part of casing 37. A second shaft 87, having a gear 89 secured thereon at its upper end which meshes with pinion 83, is supported within the casing 37 as by a bearing lug 91 at its upper end and a bearing bracket 93 supporting the shaft at its lower end. Shaft 87 has mounted thereon a cam 95, the dimensions of which are such that the outer end of sifter shaft 71 will just engage the same in one position of cam 95 while shaft 71 and the elements associated therewith will be moved toward the left against the spring 75 when cam 95 has been turned through substantially 180° from the position shown in Fig. 1 of the drawings. Rotation of shaft 87 therefore results in reciprocal movement of the sifter element in the material container, cam 95 moving the sifter element to the left from which position it is returned by the action of spring 75.

Means for reversing the position of the material container 39 includes a pinion 97 fixedly mounted on shaft 71 and engaged by a rack bar 99 movable vertically upwardly and downwardly in suitable bearing brackets 101 and 103, shown in Figs. 2 and 3 of the drawings. The lower end of rack bar 99 is provided with a laterally projecting lug 105, which lug is adapted to fit into a cam groove 107 formed in the cam disc 109, which cam disc is mounted on a shaft 111 having a horizontal axis. Shaft 111 has secured thereon a worm wheel 113 which is adapted to be engaged by a worm threaded portion 115 on shaft 79.

While I have illustrated and described specific details of a speed reducing and driving mechanism for the material container, I desire it to be understood that I do not wish to be limited to the specific details shown, but that other forms of device effective for the same purpose may be utilized, the details now shown and described being those now preferred by me.

As shown more particularly in Fig. 1 of the drawings, the casing 37 may include two portions which may be bolted together, one of the portions of casing 37 being provided with apertured lugs 117 through which suitable clamping bolts (not shown) may extend. The casing 37 and the parts supported thereby may be removably mounted on the forward end of motor assembly 17 by one or more clamping screws 119. While I have shown two such clamping screws 119, other equivalent clamping means may be provided.

If it be assumed that casing 37 has been mounted in proper operative position on motor 17, the operator can remove, say the lower cover portion 57, of the material container and put therein the desired amount of flour with or without other dry ingredients. The cover member is then placed in its proper operative position relatively to its casing member 41 and the motor may then be energized. This will operate stub shaft 33 which in turn will cause rotative movement of shaft 79 which rotative movement is transmitted to the cam 95 on shaft 87, causing the cam to rotate and to move shaft 71 and the sifter elements connected therewith to the left, the spring 75 causing these members to return to the right. This motion is substantially continuous, the number of such reciprocatory movements being determined by the speed of shafts 33 and 79 and the ratio of transmission impressed by pinion 83 and gear 89.

At the same time, cam disc 109 is caused to rotate by the action of the screw threaded portion 115 of shaft 79 on worm wheel 113, and it is to be noted that the cam groove 107 is such that rack bar 99 is held in, say its upper position, as shown in Figs. 1 and 2 of the drawings for almost one-half complete turn of disc 109 after which rack bar 99 is moved downwardly and is then held in its lower position for almost one-half complete turn of disc 109. This movement of rack bar 99 meshing with pinion 97 causes a turning movement of the material container 39 from a position where cover member 59 is uppermost to the inverted position where cover member 57 is uppermost. Since the reciprocatory movement of sifter elements 49 continues irrespective of the position of the material container, it is obvious that the dry material located in the uppermost portion of the material container will be sifted downwardly into the lower portion, and the relation between the various parts of the driving and actuating mechanism is such that all of the flour or other material to be sifted will be caused to move through the sifter from the upper into the lower part of the container before the container is reversed as to its position.

The device embodying my invention thus provides a relatively simple and compact assembly for simultaneously actuating a sifter element in the material container and for intermittently reversing the position of said material container in sequence.

While I have illustrated and described a specific embodiment of a device embodying my invention, namely that embodiment now preferred by me, I do not desire to be limited thereto, since obvious modifications may be made therein and the scope of the invention is to be limited only by the prior art or by the appended claims.

I claim as my invention:

1. In combination with an electric motor having a driving shaft, a sifter assembly including a container for material to be sifted, an agitator in the container and means actuated by the driving shaft to continuously reciprocate the agitator and to intermittently invert the container.

2. In combination with an electric motor having a driving shaft, a sifter assembly including a container for holding material to be sifted, a sieve and a movable agitator in the container and means actuated by the driving shaft to cause continuous movement of the agitator and intermittent inverting movement of the container.

3. In combination with an electric motor having a driving shaft, a sifter assembly including a vertically extending container for holding material to be sifted, means actuated by the driving shaft to cause intermittent inversion of the container, a sieve and a movable agitator in the container, resilient means to bias the agitator to one position in its travel, and means actuated by the driving shaft to move the agitator against the resilient biasing means irrespective of such inversion of the container.

4. In combination with an electric motor having a driving shaft, a sifter operatively associated therewith and including a horizontally pivotally mounted material container and means actuted by the driving shaft and including a rotatable element having a cam slot therein for intermittently sequentially turning the container around its horizontal pivotal axis through substantially 180°.

5. A sifter assembly including a casing, a power shaft in the casing, a container for material to be sifted, an agitator in the container, and driving mechanism including said power shaft effective to reciprocate the agitator and to intermittently invert the container.

6. In combination with an electric motor having a driving shaft, a sifter assembly operatively associated with the motor and comprising a casing, a material container removably rotatively mounted in the casing, a sifter element in the container and reciprocally movable therein, a spring holding the sifter element in one position, a cam in the casing operatively engaging the sifter element to move it to another position and means in the casing including a cam disc to intermittently reverse the position of the material container.

7. In combination with an electric motor having a driving shaft, a sifter assembly operatively associated with and mounted on the motor and comprising a casing, a material container rotatively and removably mounted in the casing, a reciprocally movable sifter element in the material container, a spring in the material container yieldingly urging the sifter element in one direction, a cam in the casing actuated by the driving shaft, operatively engaging the sifter element to move it against the pressure of the spring, a pinion on the material container, a rack bar in the casing engaging the pinion and means including a cam disc for actuating the rack bar.

8. In combination with an electric motor having a driving shaft, a sifter assembly mounted on the motor and including a container for holding material to be sifted, a sieve and a movable agitator in the container, a spring for biasing the agitator to one extreme position, cam means actuated by said driving shaft to recurrently move the agitator against said spring, and cam means actuated by the driving shaft to cause inversion of said container after a predetermined number of movements of said agitator.

JOSEPH S. BOWMAN.